US012650798B2

(12) United States Patent
Zhao et al.

(10) Patent No.: US 12,650,798 B2
(45) Date of Patent: Jun. 9, 2026

(54) DISPLAY DEVICE AND CASCADE CONTROL METHOD

(71) Applicants: Beijing BOE Display Technology Co., Ltd., Beijing (CN); BOE Technology Group Co., Ltd., Beijing (CN)

(72) Inventors: Yucheng Zhao, Beijing (CN); Shou Li, Beijing (CN); Jianting Wang, Beijing (CN); Zhiming Meng, Beijing (CN); Rongrong Wang, Beijing (CN); Xiao Ma, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 34 days.

(21) Appl. No.: 18/729,938

(22) PCT Filed: Jul. 31, 2023

(86) PCT No.: PCT/CN2023/110096
§ 371 (c)(1),
(2) Date: Jul. 18, 2024

(87) PCT Pub. No.: WO2024/066717
PCT Pub. Date: Apr. 4, 2024

(65) Prior Publication Data
US 2025/0117178 A1 Apr. 10, 2025

(30) Foreign Application Priority Data
Sep. 30, 2022 (CN) .......................... 202211219568.3

(51) Int. Cl.
*G06F 3/14* (2006.01)

(52) U.S. Cl.
CPC .................................. *G06F 3/1446* (2013.01)

(58) Field of Classification Search
None
See application file for complete search history.

(56) References Cited

U.S. PATENT DOCUMENTS

2016/0062725 A1* 3/2016 Odagiri ................. G06F 3/1446
345/1.3
2022/0208057 A1* 6/2022 You ....................... G06F 3/1446

FOREIGN PATENT DOCUMENTS

CN 101126973 A 2/2008
CN 103077691 A 5/2013
(Continued)

*Primary Examiner* — Carl Adams
(74) *Attorney, Agent, or Firm* — IPro, PLLC

(57) ABSTRACT

A display device is provided. The display device includes a plurality of display modules, wherein each of the plurality of display modules comprises a display component and a signal processing component; and the plurality of display modules comprise a first display module, the first display module including a first display component and a first signal processing component; wherein the first signal processing component comprises a first communication interface, a second communication interface, and a first processor, wherein the first processor is configured to determine, according to a cascade rule of the plurality of display modules, address information of display modules other than the first display module, and output the address information of other display modules via the second communication interface.

19 Claims, 6 Drawing Sheets

100:

(56) References Cited

FOREIGN PATENT DOCUMENTS

| | | | |
|---|---|---|---|
| CN | 103687228 | A | 3/2014 |
| CN | 104850384 | A | 8/2015 |
| CN | 103544916 | B | 9/2015 |
| CN | 105261329 | A | 1/2016 |
| CN | 106231759 | A | 12/2016 |
| CN | 103716418 | B | 10/2017 |
| CN | 109814821 | A | 5/2019 |
| CN | 111767015 | A | 10/2020 |
| CN | 115022290 | A | 9/2022 |
| CN | 115440157 | A | 12/2022 |
| JP | 2003140606 | A | 5/2003 |

* cited by examiner

100：

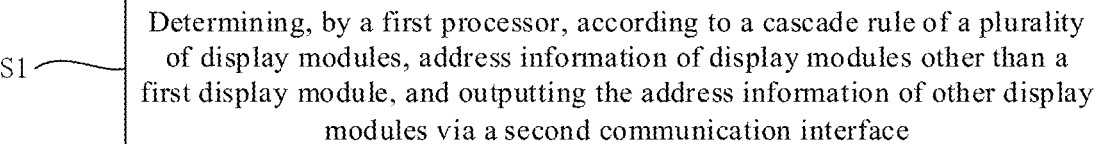

S1

Determining, by a first processor, according to a cascade rule of a plurality of display modules, address information of display modules other than a first display module, and outputting the address information of other display modules via a second communication interface

FIG. 9

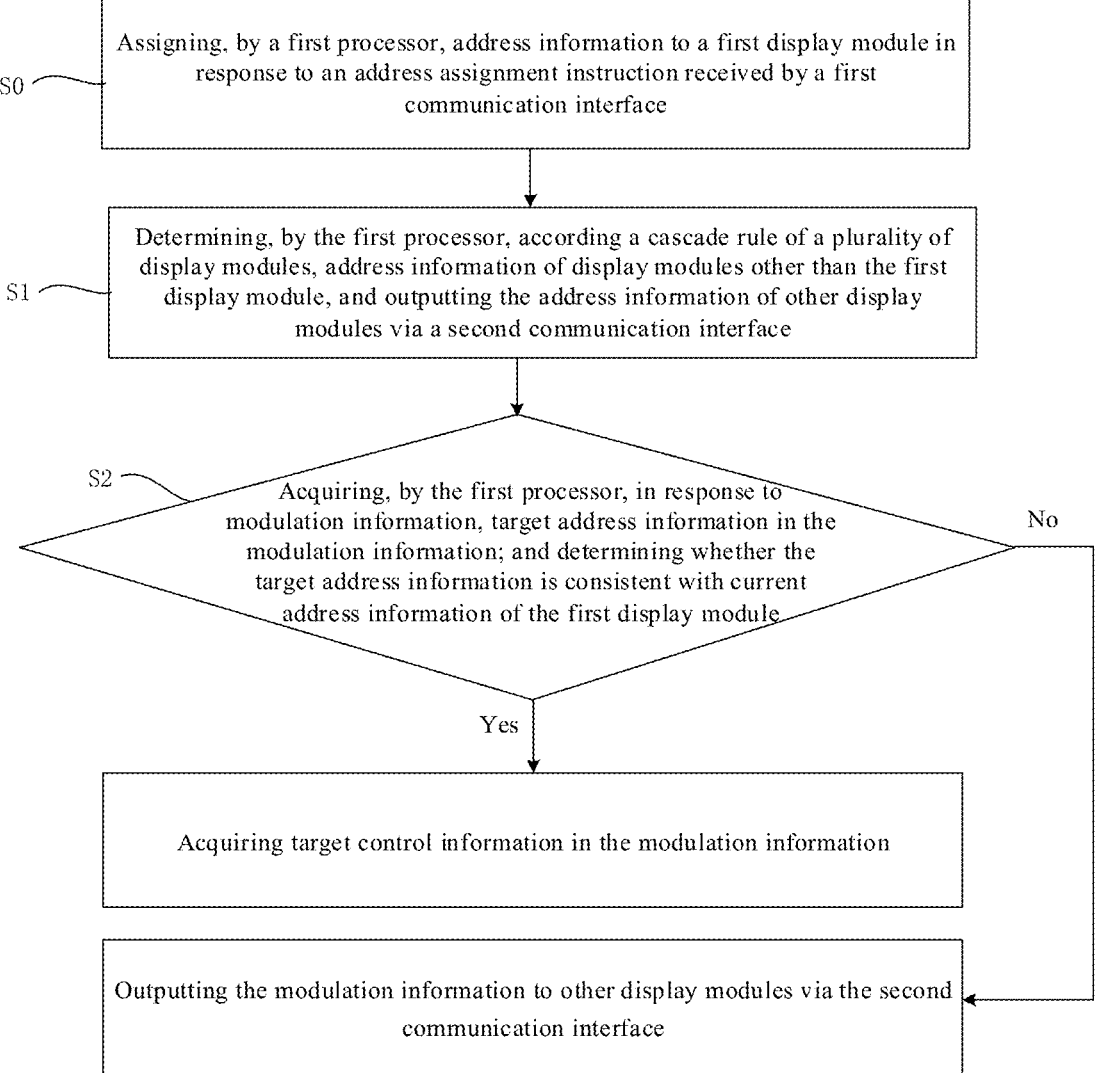

S0

Assigning, by a first processor, address information to a first display module in response to an address assignment instruction received by a first communication interface

S1

Determining, by the first processor, according a cascade rule of a plurality of display modules, address information of display modules other than the first display module, and outputting the address information of other display modules via a second communication interface

S2

Acquiring, by the first processor, in response to modulation information, target address information in the modulation information; and determining whether the target address information is consistent with current address information of the first display module No Yes Acquiring target control information in the modulation information Outputting the modulation information to other display modules via the second communication interface

FIG. 10

DISPLAY DEVICE AND CASCADE CONTROL METHOD

CROSS-REFERENCE TO RELATED APPLICATIONS

The application a U.S. national phase application based on PCT/CN2023/110096, filed on Jul. 31, 2023, which claims priority to Chinese Patent Application No. 202211219568.3, filed on Sep. 30, 2022 and entitled "DISPLAY DEVICE AND CASCADE CONTROL METHOD", all of which are hereby incorporated by reference in their entireties for all purposes.

TECHNICAL FIELD

The present disclosure relates to the field of display technologies, and in particular, relates to a display device and a cascade control method.

BACKGROUND

In some display devices (for example, spliced display devices), a plurality of display modules are connected to each other to display a picture together. To ensure the display effect of the display device, it is necessary to debug each display module of the display device, such that the display of each display module is uniform. Before debugging, an address needs to be assigned to each display module.

SUMMARY

The present disclosure provides a display device and a cascade control method.

In a first aspect, the present disclosure provides a display device, including a plurality of display modules, wherein each of the plurality of display modules includes a display component and a signal processing component; and the plurality of display modules include a first display module, the first display module including a first display component and a first signal processing component; wherein the first signal processing component includes a first communication interface, a second communication interface, and a first processor;

wherein the first processor is configured to determine, according to a cascade rule of the plurality of display modules, address information of display modules other than the first display module, and output the address information of other display modules via the second communication interface.

In some embodiments, the first processor is further configured to receive the cascade rule of the plurality of display modules via the first communication interface; and the first processor is configured to output, in response to an address assignment instruction received by the first communication interface, the address information of the other display modules via the second communication interface.

In some embodiments, the plurality of display modules are connected in a sequential series cascade; a cascade order of the first display module in the plurality of display modules is a first level; and outputting the address information of the other display modules via the second communication interface includes:

directly sending an address of a second-level display module to the second-level display module via the second communication interface; and sending address information of a $j^{th}$-level display module to the second-level display module via the second communication interface;

wherein j is a positive integer, $2 \leq j \leq N$, and N is a quantity of the plurality of display modules.

In some embodiments, sending the address information of the $j^{th}$-level display module to the second-level display module via the second communication interface includes: sending, in response to feedback information of a $(j-1)^{th}$-level display module, address information of the $j^{th}$-level display module to the second-level display module via the second communication interface.

In some embodiments, the first processor is further configured to assign, in response to an address assignment instruction received by the first communication interface, address information to the first display module; acquire, in response to modulation information, target address information in the modulation information; and determine whether the target address information is consistent with current address information of the first display module, if yes, acquire target control information in the modulation information, and if not, output the modulation information to other display modules via the second communication interface for other display modules to determine whether their address information is consistent with the target address information; and the first display module further includes a first adjusting circuit, wherein the first adjusting circuit is electrically connected with the first processor and the first display component, or the first adjusting circuit is disposed in the first processor; and the first adjusting circuit is configured to adjust a display parameter of the first display component according to the target control information.

In some embodiments, the plurality of display modules are connected in a sequential series cascade; and the plurality of display modules include a second display module, wherein the second display module is the display modules in the plurality of display modules other than the first display module, the second display module including a second processor;

wherein the second processor determines, in response to address information of a previous-level display module, whether a current-level display module completes address updating, if yes, forwards received address information to a next-level display module, and if not, performs address updating according to the received address information.

In some embodiments, the second processor is further configured to send feedback information to the previous-level display module after performing address updating according to the received address information.

In some embodiments, the second processor is further configured to send, in response to feedback information from the next-level display module, the feedback information to the previous-level display module.

In some embodiments, the second display module further includes a third communication interface and a fourth communication interface, wherein a cascade order of the first display module in the plurality of display modules is a first level, and a third communication interface of the second display module at a second level is connected to the second communication interface of the first display module; and for the second display modules of any two adjacent levels, a fourth communication interface of the second display module of a previous level is connected to a third communication interface of the second display module of a next level.

In some embodiments, the second display module further includes a second display component and a second adjusting circuit;

wherein the second processor is further configured to acquire, in response to modulation information, target address information in the modulation information; and determine whether the target address information is consistent with current address information of the second display module, if yes, acquire target control information in the modulation information, and if not, output the modulation information to other display modules for other display modules to determine whether their address information is consistent with the target address information;

the second adjusting circuit is electrically connected with the second processor and the second display component, or the second adjusting circuit is disposed in the second processor; and the second adjusting circuit is configured to adjust a display parameter of the second display component according to the target control information.

In some embodiments, series positions of the first display module and at least one second display module are exchangeable; and a function of the first display module is performed in the case that a series position of one of the at least one second display module is exchanged to a series position of the first display module; and a function of the second display module is performed in the case that the series position of the first display module is exchanged to the series position of one of the at least one second display module.

In some embodiments, the display device is a spliced display device including M display windows, wherein the M display windows include the plurality of display modules, and any one of the plurality of display modules serves as one of the M display windows; and the M display windows are arranged in one row and a plurality of columns, a plurality of rows and one column, or a plurality of rows and a plurality of columns.

In some embodiments, the M display windows are arranged in R rows and C columns, R and C being integers greater than 1;

wherein in any two adjacent rows, a last display window in a previous row is connected to a first display window in a next row, and every two adjacent display windows in the same row are connected;

or, in any two adjacent columns, a last display window in a previous column is connected to a first display window in a next column, and every two adjacent display windows in the same column are connected;

or, for any two adjacent display windows in a $u^{th}$ row and a $(u+1)^{th}$ row, in the case that u is an odd number, a last display window in the $u^{th}$ row is connected to a last display window in the $(u+1)^{th}$ row; in the case that u is an even number, a first display window in the $u^{th}$ row is connected to a first display window in the $(u+1)^{th}$ row; and every two adjacent display windows in the same row are connected, wherein u is an integer greater than 0 and less than R;

or, for any two adjacent display windows in a $v^{th}$ column and a $(v+1)^{th}$ column, in the case that v is an odd number, a last display window in the $v^{th}$ column is connected to a last display window in the $(v+1)^{th}$ column; in the case that v is an even number, a first display window in the $v^{th}$ column is connected to a first display window in the $(v+1)^{th}$ column; and every two adjacent display windows in the same column are connected, wherein v is an integer greater than 0 and less than C.

In a second aspect, the present disclosure also provides a cascade control method, wherein the method is applied to the display device in the first aspect, and includes:

determining, by a first processor of a first display module, address information of display modules other than a first display module according to a cascade rule of a plurality of display modules, and outputting the address information of other display modules via a second communication interface.

In some embodiments, the first processor receives the cascade rule of the plurality of display modules via a first communication interface; and outputting the address information of the other display modules via the second communication interface specifically includes: outputting, by the first processor, the address information of the other display modules via the second communication interface in response to an address assignment instruction received by the first communication interface.

In some embodiments, the plurality of display modules are connected in a sequential series cascade; a cascade order of the first display module in the plurality of display modules is a first level; and outputting the address information of the other display modules via the second communication interface includes:

directly sending address information of a second-level display module to the second-level display module via the second communication interface; and sending address information of a $j^{th}$-level display module to the second-level display module via the second communication interface;

wherein j is a positive integer, $2 \leq j \leq N$, and N is a quantity of the plurality of display modules.

In some embodiments, sending the address information of the $j^{th}$-level display module to the second-level display module via the second communication interface includes:

sending, in response to feedback information of a $(j-1)^{th}$-level display module, the address information of the $j^{th}$-level display module to the second-level display module via the second communication interface.

In some embodiments, the first display module further includes a first adjusting circuit, and the method further includes:

assigning, by the first processor, in response to an address assignment instruction received by the first communication interface, address information to the first display module; acquiring, in response to modulation information, target address information in the modulation information; and determining whether the target address information is consistent with current address information of the first display module, if yes, acquiring target control information in the modulation information, and if not, outputting the modulation information to other display modules via the second communication interface for other display modules to determine whether their address information is consistent with the target address information; and adjusting, by the first adjusting circuit, a display parameter of the first display component according to the target control information.

In some embodiments, the plurality of display modules are connected in a sequential series cascade; and the plurality of display modules include a second display module, wherein the second display module is the display modules in the plurality of display modules other than the first display module, the second display module including a second processor; and the method further includes:

determining, by the second processor, in response to address information of a previous-level display module, whether a current-level display module completes address updating, if yes, forwarding received address information to a next-level display module, and if not, performing address updating according to the received address information.

In some embodiments, the method further includes:

sending, by the second processor, feedback information to the previous-level display module after performing address updating according to the received address information.

In some embodiments, the method further includes: sending, by the second processor, in response to feedback information from the next-level display module, the feedback information to the previous-level display module.

In some embodiments, the second display module further includes a second display component and a second adjusting circuit; and the method further includes:

acquiring, by the second processor, in response to modulation information, target address information in the modulation information; and determining whether the target address information is consistent with current address information of the second display module, if yes, acquiring target control information in the modulation information, and if not, outputting the modulation information to other display modules for other display modules to determine whether their address information is consistent with the target address information; and adjusting, by the second adjusting circuit, a display parameter of the second display component according to the target control information.

In some embodiments, series positions of the first display module and at least one second display module are exchangeable; and a function of the first display module is performed in the case that a series position of one of the at least one second display module is exchanged to a series position of the first display module; and a function of the second display module is performed in the case that the series position of the first display module is exchanged to the series position of one of the at least one second display module.

BRIEF DESCRIPTION OF DRAWINGS

The accompanying drawings are used to provide a further understanding of the present disclosure and constitute a part of the description, and are used in conjunction with the specific embodiments below to explain the present disclosure, but do not constitute a limitation of the present disclosure. In the accompanying drawings:

6

Figure 1:
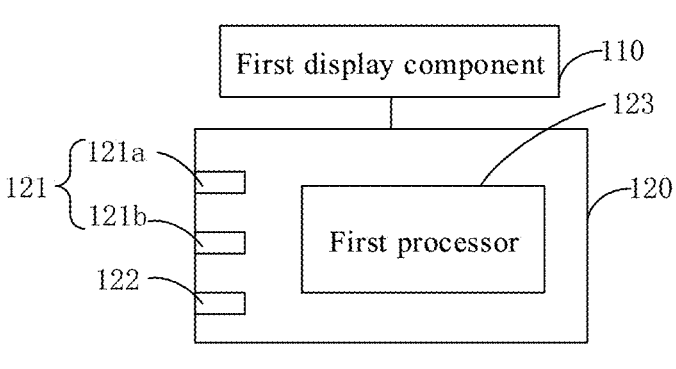
Figure 2:
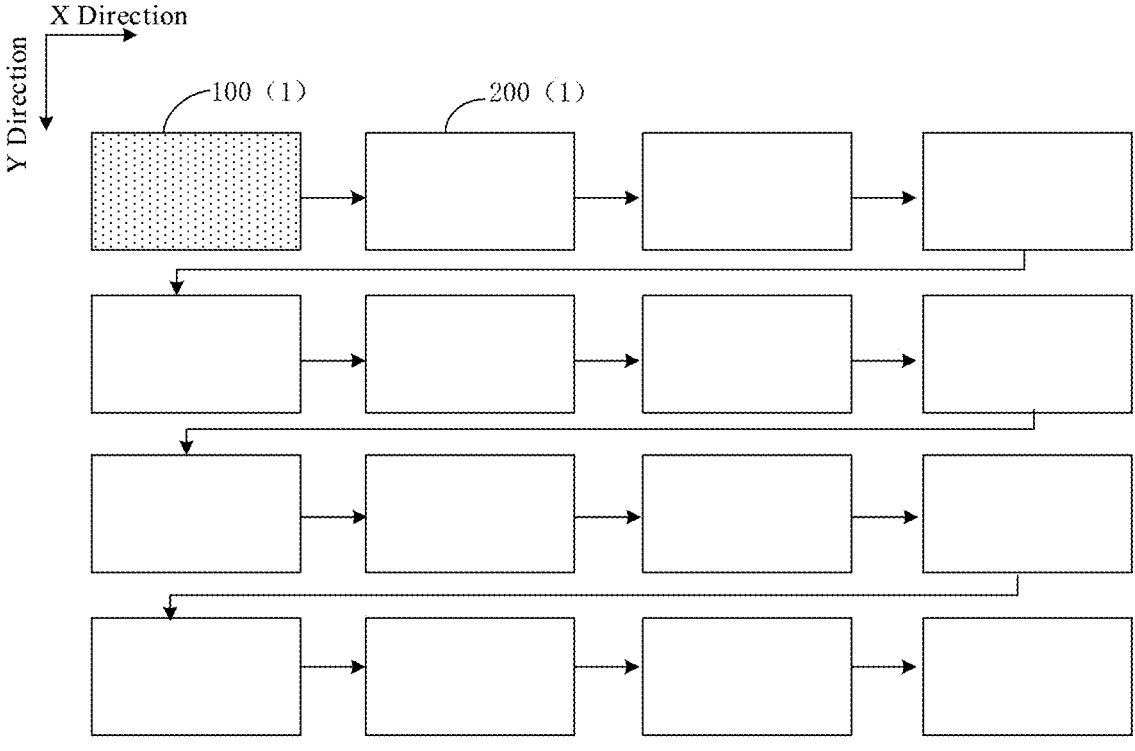
Figure 3:
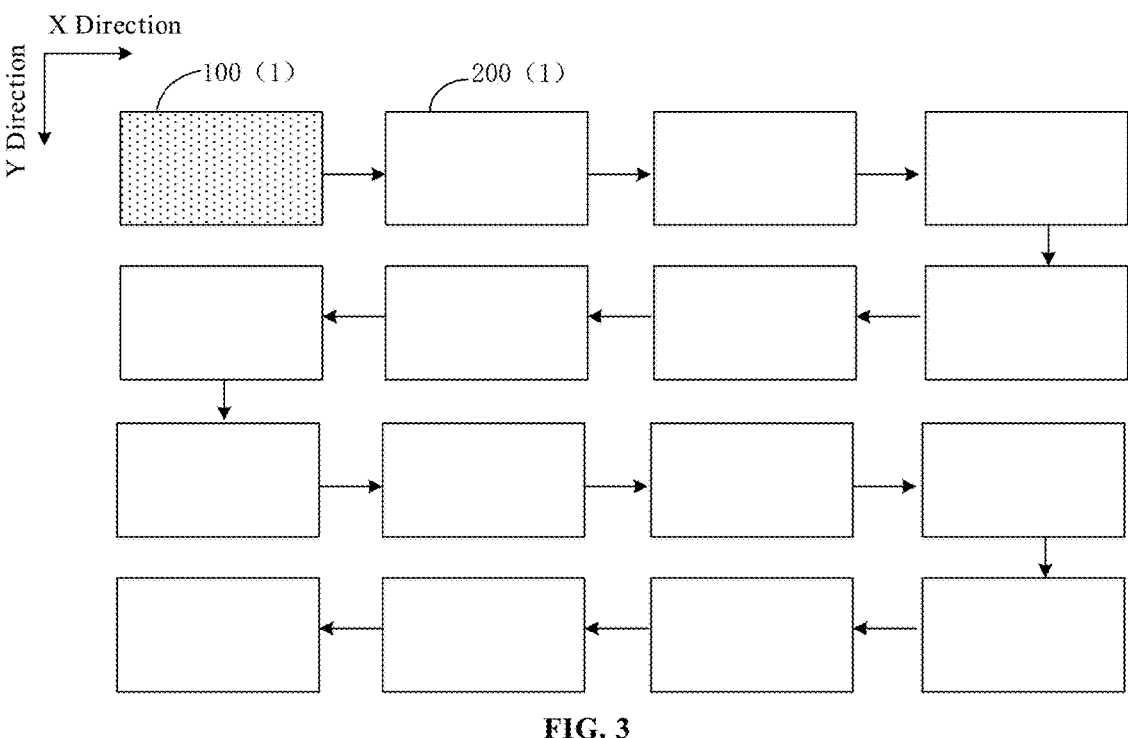
Figure 4:
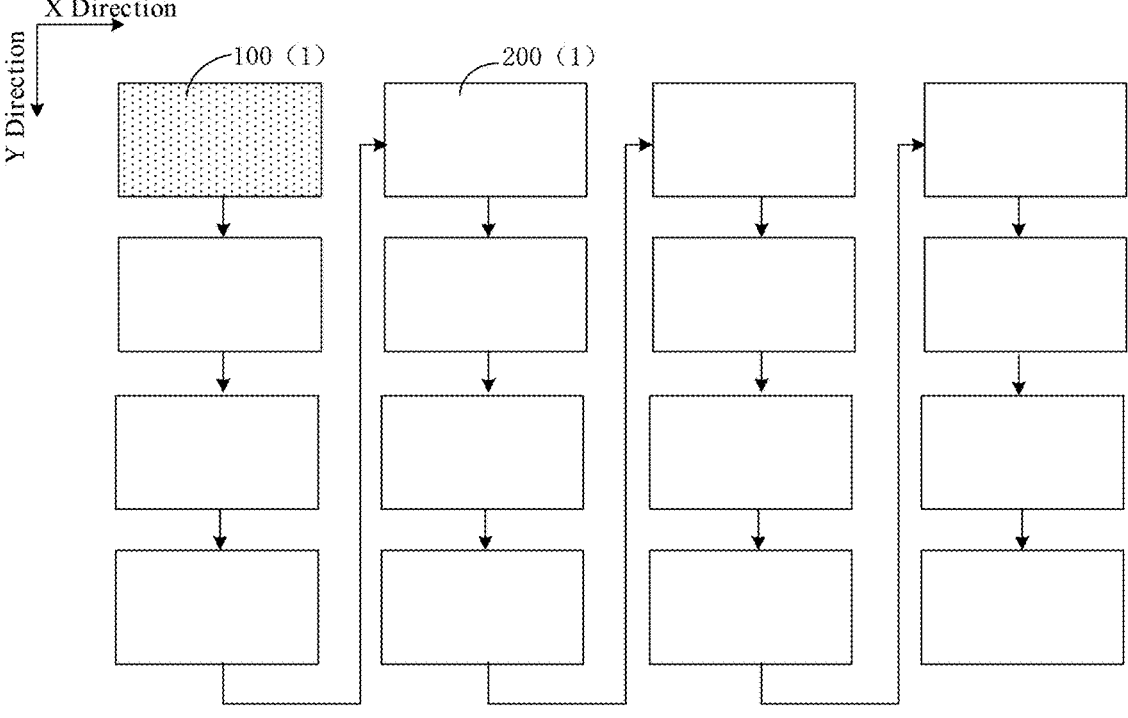
Figure 5:
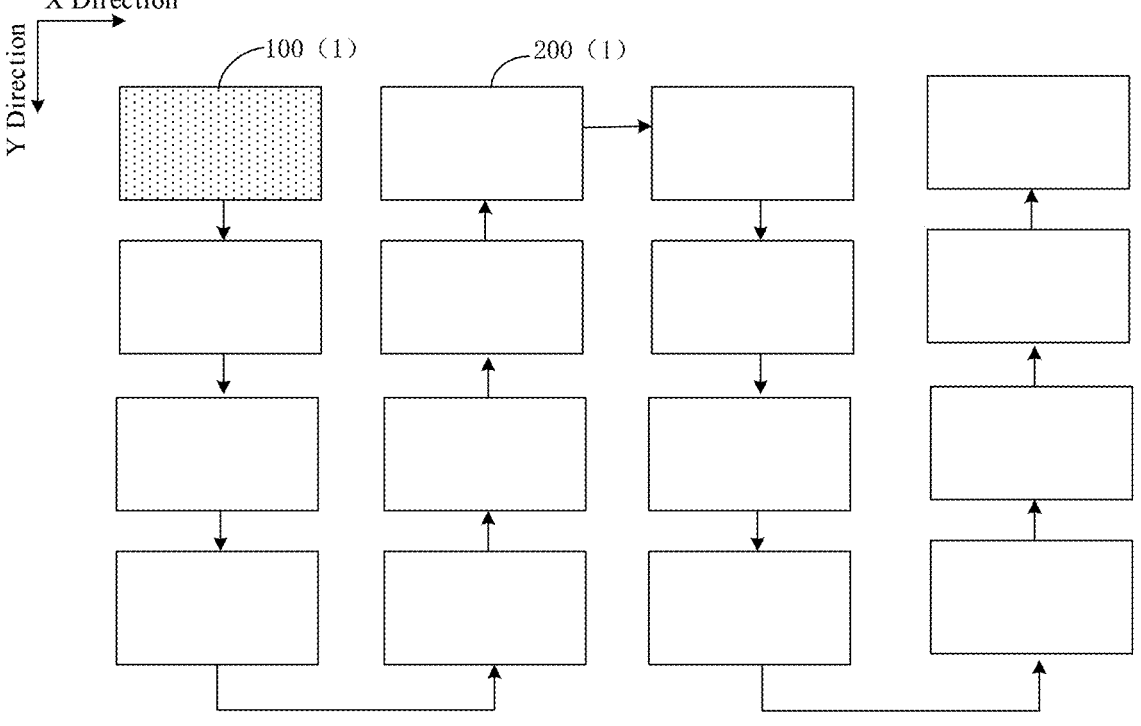
Figure 6:
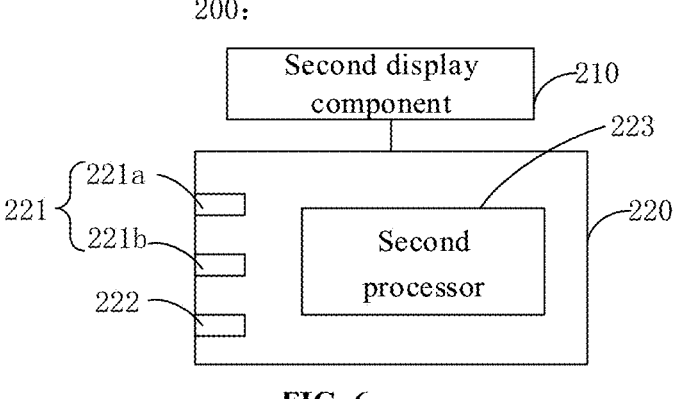
Figure 7:
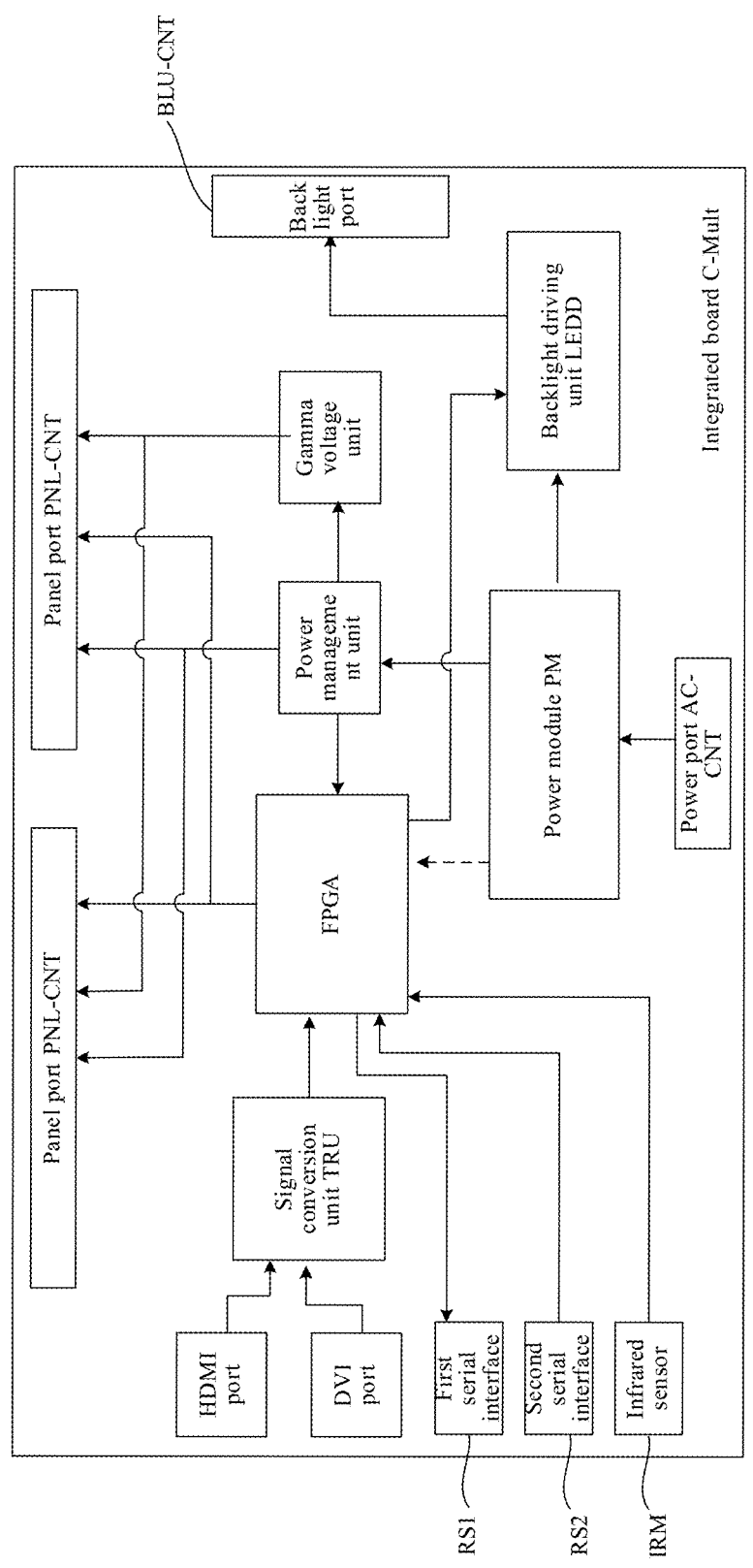
Figure 8:
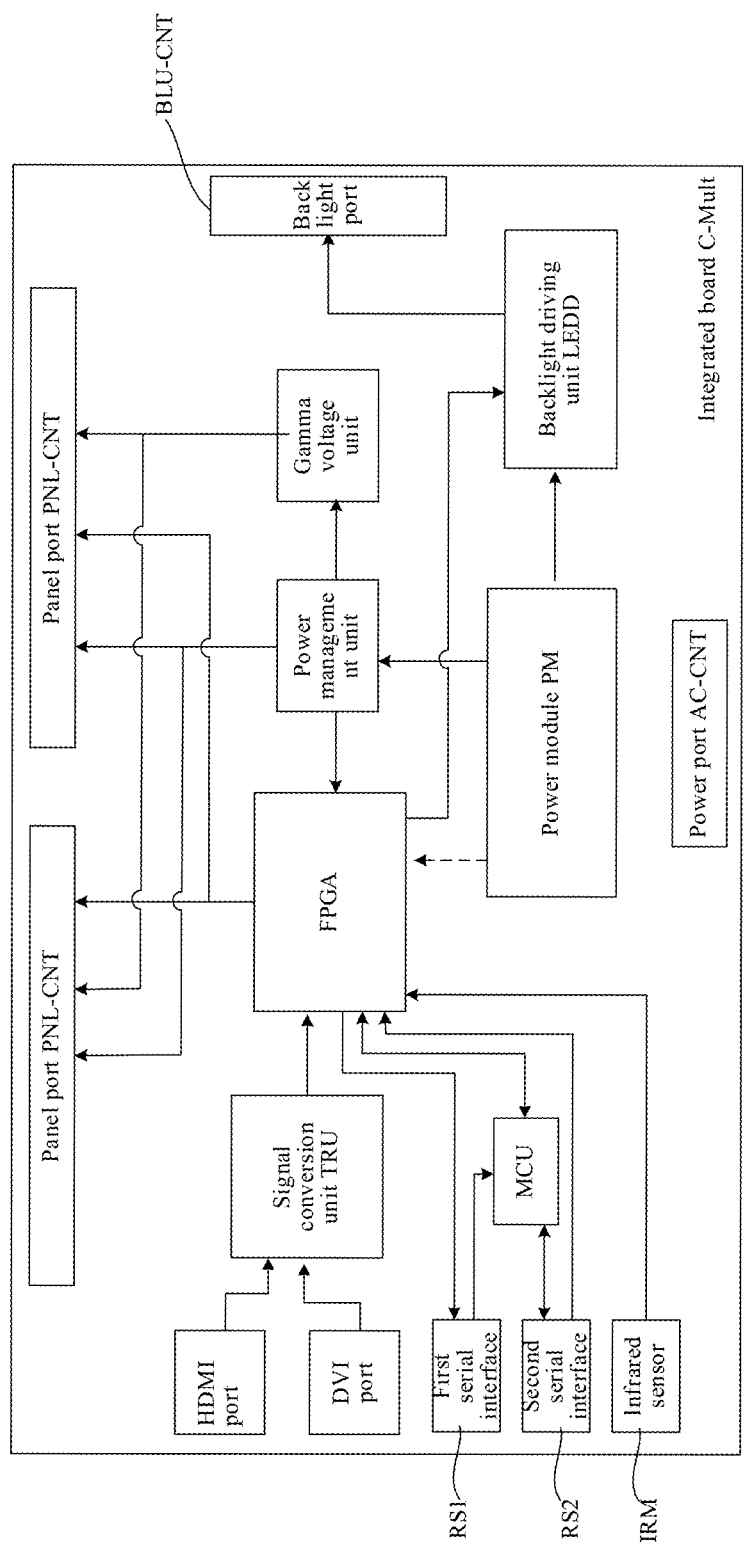

FIG. 1 is a schematic diagram of a first display module according to some embodiments of the present disclosure;

FIG. 2 is a schematic diagram of a cascading mode of N display modules according to some embodiments of the present disclosure;

FIG. 3 is a schematic diagram of a cascading mode of display modules according to some other embodiments of the present disclosure;

FIG. 4 is a schematic diagram of a cascading mode of display modules according to some other embodiments of the present disclosure;

FIG. 5 is a schematic diagram of a cascading mode of display modules according to some other embodiments of the present disclosure;

FIG. 6 is a schematic diagram of a second display module according to some embodiments of the present disclosure;

FIG. 7 is a schematic diagram of an integrated board of a display module according to some embodiments of the present disclosure;

FIG. 8 is a schematic diagram of an integrated board of a display module according to some other embodiments of the present disclosure;

FIG. 9 is a schematic diagram of a cascade control method according to some embodiments of the present disclosure; and FIG. 10 is a schematic diagram of a cascade control method according to some embodiments of the present disclosure.

DETAILED DESCRIPTION

For clearer descriptions of the objectives, technical solutions, and advantages of the embodiments of the present disclosure, the technical solutions of the embodiments of the present disclosure will be described clearly and completely hereinafter with reference to the accompanying drawings of the embodiments of the present disclosure. Obviously, the described embodiments are only a part of embodiments of the present disclosure, rather than all of the embodiments. According to the described embodiments of the present disclosure, all other embodiments obtained by those of ordinary skill in the art without any creative work shall fall within the scope of protection of the present disclosure.

Unless otherwise defined, technical terms or scientific terms used in the present disclosure shall be of ordinary meaning as understood by those of ordinary skill in the art to which the present disclosure pertains. The term "first" or "second" or a similar term used in the present disclosure does not denote any order, quantity, or importance, but is merely used to distinguish different components. Similarly, the term "a" or "an" or the like is not intended to limit the number, but to denote the number of at least one. The term "comprise", "include", or the like is intended to mean that elements or items which appear before the term include the elements or items listed after the term and their equivalents, and do not exclude other elements or items. The term "connection" or "connected to" or a similar term is not limited to a physical or mechanical connection but may include an electrical connection that is direct or indirect. The terms "upper", "lower", "left", "right" and the like are only used to indicate the relative positional relationship, and when the absolute position of a described object changes, the relative positional relationship may also change accordingly.

In some display devices (for example, spliced display devices), a plurality of display modules are connected to each other to display a picture together. To ensure the display effect of the display device, it is necessary to debug each display module of the display device, such that the display of each display module is uniform. In the related art, before all the display modules are spliced together, each display module is assigned a corresponding address, the address may be a target position of the display module in the display device, for example, a target row number and a target column number of the display module in the spliced display device. After that, the plurality of display modules are connected together according to the addresses of the display modules, and debugging is performed.

However, this method makes all the display modules be arranged only in a specific order, resulting in low assembly efficiency.

The present disclosure provides a display device including N display modules, wherein N is an integer greater than 2. Each of the N display modules includes a display component and a signal processing component. The display component may include a display panel. The N display modules include a first display module. In the N display modules, there is only one first display module. FIG. 1 is a schematic diagram of a first display module according to some embodiments of the present disclosure. As shown in FIG. 1, the first display module 100 includes a first display component 110 and a first signal processing component 120.

The first signal processing component 120 includes a first communication interface 121, a second communication interface 122, and a first processor 123. The first communication interface 121 and the second communication interface 122 may be used for communication connection with other devices (for example, other display modules or signals, or instruction input devices).

The first processor 123 is configured to determine, according to a cascade rule of the N display modules, address information of display modules other than the first display module 100, and output the address information of other display modules via the second communication interface 122.

In some embodiments, the cascade rule of the N display modules may be provided by an external instruction input device, and information about the cascade rule may be provided for the first processor 123 via the first communication interface 121.

In addition, the address information of the first display module 100 itself may be pre-stored in the first processor 123, or the first processor 123 may assign a preset address to the first display module 100 after receiving an address assignment instruction, and the address information of other display modules is determined according to the address and the cascade rule.

In the embodiments of the present disclosure, the first processor 123 in the first display module 100 may determine the address information of other display modules according to the cascade rule, and output the address information of the other display modules. That is, the positional relationship or cascade relationship between all the display modules in the display device may not be fixed, but set casually, and after all the display modules are connected, the first display module 100 may automatically assign address information to other display modules according to the cascade rule, thus improving the assembly efficiency.

In some embodiments, the first processor 123 is further configured to receive the cascade rule of the N display modules via the first communication interface 121. When the address information of other display modules is output via the second communication interface 122, the first processor 123 is specifically configured to output, in response to an address assignment instruction received by the first communication interface 121, the address information of other display modules via the second communication interface 122.

In one example, the first communication interface 121 may include a first sub-interface 121a and/or a second sub-interface 121b, the first sub-interface 121a may be connected to an external control device (for example, a computer) to receive an address assignment instruction provided by the control device; and the first sub-interface 121a may be an infrared sensor interface to receive an address assignment instruction provided by a remote controller.

In some embodiments, the N display modules are connected in a sequential series cascade, wherein the so-called "sequential series cascade" means that the N display modules are serially connected into a string in a certain order. Hereinafter, the cascade order of the first display module 100 in the N display modules being 1 is taken as an example for explanation.

The N display modules may be cascaded in various ways. FIG. 2 is a schematic diagram of a cascading mode of N display modules according to some embodiments of the present disclosure, FIG. 3 is a schematic diagram of a cascading mode of display modules according to some other embodiments of the present disclosure, FIG. 4 is a schematic diagram of a cascading mode of display modules according to some other embodiments of the present disclosure, and FIG. 5 is a schematic diagram of a cascading mode of display modules according to some other embodiments of the present disclosure. For example, the cascading mode shown in FIG. 2 is a Z-shaped connection mode. Specifically, the N display modules 1 may be arranged in a plurality of rows and a plurality of columns, the plurality of rows of display modules 1 are arranged along the Y direction, and the display modules 1 in each row are arranged along the X direction. In any two adjacent rows, the last display module 1 in a previous row and the first display module 1 in the next row are cascaded, and every two adjacent display modules in the same row are sequentially cascaded. According to this rule, the N display modules 1 are cascaded into a module string.

For example, the cascading mode shown in FIG. 3 is an inverted U-shaped connection mode. Specifically, the N display modules 1 may be arranged in R rows and C columns, the R rows of display modules 1 are arranged along the Y direction, and the display modules 1 in each row are arranged along the X direction. For any $u^{th}$ row and any $(u+1)^{th}$ row that are adjacent, in the case that u is an odd number, the last display module in the $u^{th}$ row and the last display module 1 in the $(u+1)^{th}$ row are cascaded; and in the case that u is an even number, the first display module 1 in $u^{th}$ row and the first display module 1 in the $(u+1)^{th}$ row are cascaded. R, C and u are integers, $R \geq 3$, $C \geq 2$, and $0 < u < R$. In addition, every two adjacent display modules 1 in the same row are cascaded. According to this rule, the N display modules 1 are cascaded into a module string.

For example, the cascading mode shown in FIG. 4 is an N-shaped connection mode. Specifically, the N display modules 1 may be arranged in a plurality of rows and a plurality of columns, the plurality of rows of display modules 1 are arranged along the Y direction, and the display modules 1 in each row are arranged along the X direction. For any two adjacent columns of display modules 1, the last display module 1 in a previous column and the first display module 1 in a next column are cascaded, and every two adjacent display modules 1 in the same column are cascaded. According to this rule, the N display modules 1 are cascaded into a module string.

For example, the cascading mode shown in FIG. 5 is a U-shaped connection mode. Specifically, the N display modules 1 may be arranged in R rows and C columns, the R rows of display modules 1 are arranged along the Y direction, and the display modules 1 in each row are arranged along the X direction. For any $v^{th}$ column and any $(v+1)^{th}$ column that are adjacent, in the case that v is an odd number, the last display module 1 in the $v^{th}$ column and the last display module 1 in the $(v+1)^{th}$ column are cascaded; and in the case that v is an even number, the first display module 1 in the $v^{th}$ column and the first display module 1 in the $(v+1)^{th}$ column are cascaded. R, C and v are integers, R≥2, C≥3 and 0<v<C. In addition, every two adjacent display modules 1 in the same column are cascaded. According to this rule, the N display modules 1 are cascaded into a module string.

In some embodiments, in the N display modules 1, the display modules 1 other than the first display module 100 are second display modules 200. FIG. 6 is a schematic diagram of a second display module according to some embodiments of the present disclosure. As shown in FIG. 6, the second display module 200 includes a second display component 210 and a second signal processing component 220, and the second signal processing component 220 includes a third communication interface 221, a fourth communication interface 222, and a second processor 223. In some embodiments, the first communication interface 121 of the first display module 100 may include a first sub-interface 121a and a second sub-interface 121b, wherein the first sub-interface 121a may be an RS232 standard interface (asynchronous transfer standard interface), and the second sub-interface 121b is used for receiving an infrared signal. The third communication interface 221 of the second display module 200 may include a third sub-interface 221a and a fourth sub-interface 221b, wherein the third sub-interface 221a may be an RS232 interface, and the fourth sub-interface 221b is used for receiving an infrared signal. In the module string formed by the various cascading modes described above, the second communication interface 122 of the first display module 100 is connected to the third sub-interface 221a of the adjacent second display module 200; and for any two adjacent levels of second display modules 200 in the module string, the fourth communication interface 222 of the second display module 200 of a previous level is connected to the third sub-interface 221a of the second display module 200 of a next level.

In some embodiments, the cascade rule of the plurality of display modules received by the first communication interface 121 may include the number of rows and the number of columns of the N display modules, and also include the cascading mode. The first processor 123 may determine the address information of the display module in a cascade order according to the cascading mode and the number of rows and the number of columns of the N display modules. When outputting the address information, the first processor 123 may sequentially output the address information of display modules other than the first display module 100 according to the cascade order, and a is an integer greater than 1 and less than or equal to N. For example, the cascade order of the first display module 100 in the N display modules is 1. The first display module 100 sequentially outputs the address information of a second-level display module, of a third-level display module, of the fourth-level display module, and the like, i.e., the address information output for the $p^{th}$ time is address information of a $(p+1)^{th}$-level display module.

In some embodiments, the process in which the first processor 123 sequentially outputs the address information of other display modules to the corresponding display modules via the second communication interface 122 specifically includes: the first processor 123 directly sends an address of the second-level display module to the second-level display module via the second communication interface 122; and sends address information of a $j^{th}$-level display module to the second-level display module via the second communication interface 122, such that the second-level display module sends the address information of the $j^{th}$-level display module backward until it is sent to the $j^{th}$-level display module, j is a positive integer, and 2≤j≤N.

In some embodiments, the second display module 200 further includes a second processor 223 in addition to the third communication interface 221 and the fourth communication interface 222. The second processor 223 determines, in response to address information of a previous-level display module, whether a current-level display module completes address updating, if yes, forwards received address information to a next-level display module, and if not, performs address updating according to the received address information.

It can be understood that in the same second display module 200, the second processor 223 is connected to the third communication interface 221 and the fourth communication interface 222, and the second processor 223 receives the address information of the previous-level display module via the third communication interface 221.

It should be noted that the address information may not be stored in each display module before address assignment for the first time; and the address information is stored in each display module after one-time address assignment. The above-mentioned "address updating" may be a process in which the display module goes from no address storage to address storage, and may also be a process in which a stored old address is updated into a new address.

In practice, when the addresses of the display modules need to be updated (for example, when all the display modules are cascaded together for the first time, or when the cascade orders or positions of all the display modules change), a user can input an address assignment instruction into the first display module 100 and send an address updating instruction to each second display module 200. The first display module 100 sequentially outputs the address information of other display modules according to the address assignment instruction. For each second display module 200, when the second display module 200 receives the address information, whether the address of the display module of the current level has been updated from receipt of the address updating instruction to the current time may be determined, if no, the received address information is stored as its own updated address information, and if yes, it means that the address information received at this time is not the address information of the display module of the current level, and the address information is sent to the display module of a next level.

In addition, for the second processor 223 in each second display module 200, the second processor 223 is further configured to send feedback information to a previous-level display module after performing address updating according to the received address information, and the feedback information is finally sent to the first display module 100. The feedback information is information indicating that the display module has completed address updating. In addition, for each second processor 223, the second processor 223 is further configured to send, in response to feedback information from a next-level display module, the feedback information to a previous-level display module. For example, after the address information output by the first display module 100 at a first level is sent to the second display module 200 of level 5, and the second display module 200 of level 5 completes address updating, the feedback information is sent to the second display module 200 of level 4, and the feedback information passes through the second display module 200 of level 4, the second display module 200 of level 3, and the second display module 200 of level 2 and is finally received by the first display module 100.

In some embodiments, for the first processor 123, the process in which the first processor 123 sends the address information of the $j^{th}$-level display module to the second-level display module via the second communication interface 122 may specifically include that the first processor 123 sends, in response to feedback information of a $(j-1)^{th}$-level display module, the address information of the $j^{th}$-level display module to the second-level display module via the second communication interface 122. That is, the first processor 123 may send the address information of the $(j-1)$ $^{th}$-level display module after receiving the feedback information of the $(j-1)^{th}$-level display module, to prevent information congestion (for example, a second display module 200 receives another piece of address information in the process of receiving and updating the address information), which in turn ensures the accuracy of address assignment and address updating.

The address updating process of the N-level display module is described in the following example. It should be noted that in the embodiments of the present disclosure, the series positions of the first display module 100 and the at least one second display module 200 are exchangeable, and the function of the second display module 200 is performed in the case that the series position of the first display module 100 is exchanged to the series position of one of the at least one second display module 200. That is, any one of the N display modules may be the first display module 100 or the second display module 200. Therefore, the cascade relationship between the display modules in the display device may not be fixed, but set casually, and after all the display modules are connected, the display module at the first level serves as the first display module and may automatically assign address information to other display modules according to the cascade rule, thus improving the assembly efficiency.

After the N display modules are cascaded into a module string (for example, all the display modules are cascaded for the first time, or the plurality of display modules cascaded together are adjusted in cascade order and re-cascaded), the user can send an address assignment instruction to the first-level display module by the remote controller and send an address updating instruction to all the display modules of the subsequent levels. In addition, the address assignment instruction may also be sent to the first-level display module by using a peripheral computer and other control devices, and the address updating instruction may be sent by the user to the display modules of the subsequent levels by the remote controller, or the first-level display module may send the address updating instruction to the second display modules 200 of the subsequent levels after receiving the address assignment instruction and before outputting the address information.

After receiving the address assignment instruction, the first-level display module performs the function of the first display module 100 described above as the first display module 100, and other display modules perform the function of the second display module 200 described above as the second display module 200.

For example, the plurality of display modules are arranged in 3 rows and 3 columns in a Z-shaped manner. The first display module 100 determines its address information in response to an address assignment instruction, and determines the address information of each second display module 200 according to the cascade rule. After that, the first processor 123 of the first display module 100 sequentially outputs second address information of all the second display modules 200 via the second communication interface 122.

For example, the address information of each display module includes the row and the column where the display module is disposed in the display device. The first processor 123 determines that its address information is (1,1), and the address information of the second to ninth-level display modules is (1,2), (1,3), (2,1), (2,2), (2,3), (3,1), (3,2) and (3,3) respectively. After that, the first processor 123 of the first display module 100 sequentially outputs the second to ninth-level display modules according to the cascade order. Specifically, the first processor 123 outputs the address information (1,2) for the first time. After the address information is output to the second-level display module, as the second-level display module has not performed address updating after receiving the address updating instruction, the second-level display module stores (1,2) as its address information and sends a feedback signal to the first display module 100. The first processor 123 outputs an address for the second time after receiving the feedback signal, the address information output for the second time is (1,3), and the address information is output to the second-level display module. As the second-level display module has completed address updating after receiving the address updating instruction, the second-level display module sends the address information (1,3) to a third-level display module. However, as the third-level display module has not performed address updating after receiving the address updating instruction, the third-level display module stores the address information (1,3) as its address information, and sends a feedback signal to the second-level display module, and the second-level display module sends the feedback signal to the first display module 100. The first processor 123 outputs an address for the third time after receiving the feedback signal, the address information output for the third time is (2,1), and the address information is output to the second-level display module. As the second-level display module has completed address updating after receiving the address updating instruction, the second-level display module sends the address information (2,1) to the third-level display module. Similarly, as the third-level display module has completed address updating after receiving the address updating instruction, the third-level display module sends the address information (2,1) to the fourth-level display module. However, as the fourth-level display module has not performed address updating after receiving the address updating instruction, the fourth-level display module stores the address information (2,1) as its address information and sends a feedback signal to the third-level display module. The feedback information is sent to the first display module 100 through the third-level display module and the second-level display module in sequence. The rest can be done in the same manner until the first display module 100 outputs the address information of other display modules.

In some embodiments, both the first display module 100 and the second display module 200 have a parameter adjustment function, and thus can adjust the display parameter of the display component according to their respective address information and the received modulation information. Specifically, the first processor 123 is further configured to acquire, in response to modulation information, target address information in the modulation information; and determine whether the target address information is consistent with current address information of the first display module 100, if yes, acquire target control information in the modulation information, and if not, output the modulation information to other display modules via the second communication interface 122 for other display modules to determine whether their address information is consistent with the target address information. The first display module 100 further includes a first adjusting circuit. The first adjusting circuit is electrically connected with the first processor 123 and the first display component 110, or the first adjusting circuit is disposed in the first processor 123. The first adjusting circuit is configured to adjust a display parameter of the first display component 110 according to the target control information. The modulation information received by the first processor 123 is the modulation information received by the first communication interface 121.

Similarly, the second processor 223 of the second display module 200 is further configured to acquire, in response to modulation information, target address information in the modulation information; and determine whether the target address information is consistent with current address information of the second display module 200, if yes, acquire target control information in the modulation information, and if not, output the modulation information to other display modules for other display modules to determine whether their address information is consistent with the target address information. The second display module 200 further includes a second adjusting circuit. The second adjusting circuit is electrically connected with the second processor 223 and the second display component 210, or the second adjusting circuit is disposed in the second processor 223. The second adjusting circuit is configured to adjust a display parameter of the second display component 210 according to the target control information.

In some preferred embodiments, the modulation information is transmitted unidirectionally in the N display modules. That is, the modulation information received by the second processor 223 is specifically the modulation information received by the third communication interface 221. When the second processor 223 determines that the target address information is inconsistent with the current address information of the second display module 200, the second processor 223 sends the modulation information to a next-level display module via the fourth communication interface 222, namely, a display module that has not received the modulation information.

For example, by taking a plurality of display modules arranged in 3 rows and 3 columns and cascaded in a Z-shape as an example, in the case that the display parameter of the third-level display module (namely, the display module with the address (1,3)) is needed to be adjusted, modulation information is input into the first-level display module (namely, the first display module 100), and the modulation information includes target address information (1,3); after receiving the modulation information, the first-level display module acquires the target address information therein, determines that the target address information is inconsistent with its current address information (1,1), and thus outputs the modulation information to the second-level display module; after receiving the modulation information, the second-level display module acquires the target address information therein, determines that the target address information is inconsistent with its current address information (1,2), and thus outputs the modulation information to the third-level display module; and after receiving the modulation information, the third-level display module acquires the target address information therein and determines that the target address information is consistent with its current address information (1,3), such that the second processor 223 in the third-level display module acquires the target control information in the modulation information, and the second adjusting circuit adjusts the display parameter of the second display module 210 according to the target control information.

In some embodiments, the display parameter mentioned above may include at least one of display brightness, color temperature, contrast, and other parameters.

In some embodiments, the modulation information may specifically include a modulation data set, which may include a plurality of bits of data. For any display module, the process of acquiring the target control information in the adjustment information by the display module may specifically include: acquiring data of a first position from the modulation data set as the target address information according to a preset transmission protocol. The process of acquiring the target control information in the modulation information by the display module may include: acquiring data of a second position from the modulation data set as the target control information according to a preset transmission protocol.

It should be noted that the above-mentioned "first position" or "second position" does not necessarily refer to one data bit, but may include a plurality of data bits. For example, the data of the first position may include data of the $f^{th}$ to $g^{th}$ data bits, wherein f and g are integers, both of f and g are greater than 0 and less than or equal to the total number of bits in the modulation data set, and $g \geq f$. The data of the second position may include data of the $k^{th}$ to $k'^{th}$ data bits, wherein k and k' are integers, both of k and k' are greater than 0 and less than or equal to the total number of bits of the modulation data set, and $k \geq k'$.

In some embodiments, the display parameters of the plurality of display modules may also be adjusted simultaneously. In this embodiment, after receiving the modulation information and determining whether the target address information is consistent with currently stored address information, the display modules other than the last-level display module send the modulation information to next-level display modules regardless of the result of determination. In one example, the target address information of the first position may be specific address information, and the specific address information is configured to represent parameter adjustment of all data modules. After any display module acquires the specific address information described above, it is determined that the specific address information is consistent with the current address information of the display module, such that the parameter of the display module is adjusted according to the target control information in the modulation information. In addition, the display modules other than the last-level display module send the modulation information to next-level display modules.

In another example, the modulation information may include one modulation data set or a plurality of modulation data sets, and each modulation data set includes target address information and target control information. For any display module, after the modulation information is acquired, in the case that the current address information of the display module is consistent with certain target address information in the modulation information, the target control information in the same modulation data set as the target address information is acquired, and the parameter of the display module is adjusted according to the target control information.

In the embodiments of the present disclosure, the display device may be a spliced display device. In one example, the spliced display device includes the N display modules as described above, and the N display modules may be arranged in a plurality of rows and a plurality of columns as described above. In addition, the N display modules may also be arranged in one row and a plurality of columns, or a plurality of rows and one column. In another example, the spliced display device includes M display windows, and the M display windows may be arranged in one row and a plurality of columns, a plurality of rows and one column, or a plurality of rows and a plurality of columns, and at least some of the M display windows belong to the N display modules. M≥N, and each of the N display modules described above serves as one display window. That is, when M>N, the spliced display device may include an additional display window in addition to the above-mentioned N display modules, and the additional display window may not participate in the above-mentioned process of address assignment.

It should be understood that when the M display windows are arranged in a plurality of rows and a plurality of columns, the N display modules may still be connected in a cascade manner as described above.

By taking the N display modules arranged in R rows and C columns as an example, when the N display modules are arranged in a Z-shaped manner, in any two adjacent rows, the last display module in a previous row is connected to the first display module in a next row, and every two adjacent display modules in the same row are connected.

When the N display modules are arranged in an N-shaped manner, in any two adjacent columns, the last display module in a previous column is connected to the first display module in a next column, and every two adjacent display modules in the same column are connected.

When the N display modules are connected in an inverted U-shaped manner, for the display modules in any $u^{th}$ row and any $(u+1)^{th}$ row that are adjacent, in the case that u is an odd number, the last display module in the $u^{th}$ row is connected to the last display module in the $(u+1)^{th}$ row; in the case that u is an even number, the first display module in the $u^{th}$ row is connected to the first display module in the $(u+1)^{th}$ row; every two adjacent display modules in the same row are connected, wherein u is an integer greater than 0 and less than R.

When the N display modules are connected in a U-shaped manner, for the display modules in any $v^{th}$ column and any $(v+1)^{th}$ column that are adjacent, in the case that v is an odd number, the last display module in the $v^{th}$ column is connected to the last display module in the $(v+1)^{th}$ column; in the case that v is an even number, the first display module in the $v^{th}$ column is connected to the first display module in the $(v+1)^{th}$ column; every two adjacent display modules in the same column are connected, wherein v is an integer greater than 0 and less than C.

It should be noted that when M>N and the N display modules are assigned addresses, the address of each display module may be the row and the column where the display module is disposed in the M display windows.

In addition, when M>N, the N display modules may be cascaded sequentially, the remaining additional display windows may be cascaded sequentially, and there may be no alternating connection between the display modules and the additional display windows.

In the embodiments of the present disclosure, the display module may include an integrated board. FIG. 7 is a schematic diagram of an integrated board of a display module according to an embodiment of the present disclosure. As shown in FIG. 7, the integrated board C-Mult includes a field programmable gate array (FPGA), a power management unit PMIC, a gamma voltage unit GMIC, a power module PM, and a backlight driving unit LEDD, which are arranged on the same circuit board. In addition, the circuit board is also provided with a panel port PNL-CNT for connection with the display component, a backlight port BLU-CNT for connection with a backlight module, and a power port AC-CNT connected to an external power supply.

The FPGA is configured to generate, after receiving picture date, picture synchronization data according to the picture data, send the picture synchronization data to the display component, generate backlight driving data according to the picture data, and send the backlight driving data to the backlight driving unit LEDD. The backlight driving unit LEDD is configured to drive the backlight module directly according to the backlight driving data. The power module PM may supply power for the power management unit PMIC, and the power management unit PMIC may supply power for the FPGA, for example, a voltage of 3.3V is provided as a working voltage of the FPGA. In addition, in other embodiments of the present disclosure, power of the FPGA may come from the power module PM rather than the power management unit PMIC, i.e., the power module PM may directly supply power for the FPGA (as shown by a dotted arrow in FIG. 7).

The power management unit PMIC may generate AVDD and provide the AVDD for the display module via a panel terminal to serve as a power supply for some devices in the display module, for example, as a power supply for a source driving circuit in the display module. The power management unit PMIC may also generate and provide a VGL voltage (gate drive low level) and a VGH voltage (gate drive high level) to the display module via the panel port. The power management unit PMIC may also generate HAVDD (namely, half of the AVDD voltage) and provide the HAVDD for a gamma voltage unit GMIC as a working voltage of the gamma voltage unit GMIC. Powered by the power management unit PMIC, the gamma voltage unit GMIC may generate a gamma binding point voltage VGamma corresponding to each gamma binding point gray scale according to stored gamma register data, and transmit the gamma binding point voltage VGamma to a source driving circuit SIC. In this way, the source driving circuit may determine the gamma voltage of each pixel according to the synchronous picture data and the gamma binding point voltage VGamma. Thus, the source driving circuit realizes gamma compensation of a display picture. Referring to FIG. 7, in this example, the gamma voltage unit GMIC may also generate a common voltage and transmit the common voltage to the display component.

The integrated board further includes a communication module disposed on the circuit board, and the communication module is configured to achieve at least one of the functions of receiving a video signal, receiving a control signal, and sending a signal to the outside.

The communication module includes at least one video signal port and a signal conversion unit TRU. The video signal port is configured to receive a video signal and forward the video signal to the signal conversion unit TRU.

The video signal port is selected from one or more of an HDMI port, a DVI port, a VGA port, and a DP port. In one example, referring to FIG. 7, the integrated board is provided with an HDMI port and a DVI port. The signal conversion unit TRU is configured to transcode the video signal into the picture data and forward the picture data to the FPGA. In this way, the communication module may receive the video signal and provide the picture data for the FPGA according to the video signal.

In an example, referring to FIG. 7, the signal conversion unit TRU may forward the picture data to the FPGA in the form of a TTL signal, and for example, may forward the picture data in the form of a 24-channel TTL signal. It can be understood that in other examples of the present disclosure, the signal conversion unit TRU may also forward the picture data by using other signals, such as an SPI signal, an LVDS signal, or a Mini LVDS signal.

The communication module of the integrated board C-Mult may also include a serial communication interface, and the serial communication interface may include a first serial interface RS1 and a second serial interface RS2. The first serial interface RS1 is used to receive an external communication signal, and for example, is configured to receive an external control signal and transmit the external control signal to the FPGA. The second serial interface RS2 is used to send a communication signal to the outside, and for example, is configured to send a signal generated by the FPGA to the outside. In one example, the first serial interface RS1 and the second serial interface RS2 are RS-232 standard interfaces.

The communication module further includes an infrared sensor IRM. The infrared sensor IRM is configured to receive an infrared signal to generate a control signal and transmit the control signal to the FPGA.

In the embodiments of the present disclosure, a processor may be integrated in the FPGA. When the display module is used as the first display module 100, the processor performs the function of the first processor 123. In addition, the infrared sensor performs the function of the second sub-interface 121b, the first serial interface serves as the first sub-interface 121a, and the second serial interface serves as the second communication interface 122. When the display module is used as the second display module 200, the processor serves the function of the second processor 223. In addition, the infrared sensor serves the function of the fourth sub-interface 221b described above, the first serial interface serves as the third sub-interface 221a described above, and the second serial interface serves as the fourth communication interface 222 described above.

In addition, when the parameter of the display module is adjusted, the processor may provide a control signal for the backlight driving unit, such that the backlight brightness is controlled by the backlight control unit to adjust parameters such as brightness and contrast.

FIG. 8 is a schematic diagram of an integrated board of a display module according to other embodiments of the present disclosure. The integrated board C-Mult shown in FIG. 8 is similar to the integrated board C-Mult shown in FIG. 7, and their only difference lies in that in FIG. 8, the integrated board C-Mult is also provided with a microprocessor chip MCU, and information may be exchanged between the microprocessor chip MCU and the FPGA. In this case, the first processor 123 or the second processor 223 may be integrated into the microprocessor chip MCU. The first adjusting circuit or the second adjusting circuit may be integrated into the microprocessor chip MCU.

In practice, when the amount of calculation required to be loaded by the FPGA in the display process of the display module is too large to integrate the first processor 123/second processor 223, the first processor 123/the second processor 223 may be integrated into the microprocessor chip MCU.

The embodiments of the present disclosure further provide a cascade control method, which is applied to the display device as described in the foregoing embodiments. FIG. 9 is a schematic diagram of a cascade control method according to some embodiments of the present disclosure. As shown in FIG. 9, the cascade control method includes the following step.

In S1, a first processor of a first display module determines, according to a cascade rule of a plurality of display modules, address information of display modules other than the first display module, and outputs the address information of other display modules via a second communication interface.

In some embodiments, the first processor receives the cascade rule of the plurality of display modules via a first communication interface. In S1 as described above, the process of outputting the address information of the other display modules via the second communication interface may include: outputting, by the first processor, address information of the other display modules via the second communication interface in response to an address assignment instruction received by the first communication interface.

In some embodiments, the plurality of display modules are connected in a sequential series cascade; and a cascade order of the first display module in the plurality of display modules is a first level. At this time, in S1 as described above, when the address information of the other display modules is output via the second communication interface, the address information of the display modules from the second level to the $j^{th}$ level may be output sequentially. Specifically, an address of a second-level display module is directly sent to the second-level display module via the second communication interface; and address information of the $j^{th}$-level display module is sent to the second-level display module via the second communication interface; wherein j is a positive integer, $2 \leq j \leq N$, and N is a quantity of the plurality of display modules.

In some embodiments, sending the address information of the $j^{th}$-level display module to the second-level display module via the second communication interface includes: sending, in response to feedback information of the $(j-1)^{th}$ display module, the address information of the $j^{th}$-level display module to the second-level display module via the second communication interface.

In some embodiments, the first display module further includes a first adjusting circuit. FIG. 10 is a schematic diagram of a cascade control method according to some embodiments of the present disclosure. As shown in FIG. 10, the cascade control method further includes the following steps.

In S0, the first processor assigns, in response to an address assignment instruction received by the first communication interface, address information to the first display module.

In S2, the first processor acquires, in response to modulation information, target address information in the modulation information; and determines whether the target address information is consistent with current address information of the first display module, if yes, acquires target control information in the modulation information, and if not, outputs the modulation information to other display modules via the second communication interface for other display modules to determine whether their address information is consistent with the target address information. The first adjusting circuit adjusts a display parameter of the first display component according to the target control information.

In some embodiments, the plurality of display modules are connected in a sequential series cascade; and the plurality of display modules include a second display module, wherein the second display module is the display modules in the plurality of display modules other than the first display module, the second display module including a second processor. In this case, the cascade control method further includes: determining, by the second processor, in response to address information of a previous-level display module, whether a current-level display module completes address updating, if yes, forwarding received address information to a next-level display module, and if not, performing address updating according to the received address information.

In some embodiments, the cascade control method further includes: sending, by the second processor, feedback information to a previous-level display module after performing address updating according to the received address information. In addition, the second processor sends, in response to feedback information from a next-level display module, the feedback information to a previous-level display module.

In some embodiments, as described above, the second display module further includes a second display component and a second adjusting circuit. At this time, the cascade control method may further include: acquiring, by the second processor, in response to modulation information, target address information in the modulation information; and determining whether the target address information is consistent with current address information of the second display module, if yes, acquiring target control information in the modulation information, and if not, outputting the modulation information to other display modules for other display modules to determine whether their address information is consistent with the target address information. The second adjusting circuit adjusts a display parameter of the second display component according to the target control information.

In some embodiments, series positions of the first display module and at least one second display module are exchangeable; a function of the first display module is performed in the case that a series position of one of the at least one second display module is exchanged to a series position of the first display module; and a function of the second display module is performed in the case that the series position of the first display module is exchanged to the series position of one of the at least one second display module.

The process in which the first display module assigns addresses to all other display modules after the plurality of display modules in the display device are cascaded, and the process in which the display parameter of at least one display module is adjusted after the address of each display module is determined have been described above, and thus neither of them will be repeated herein.

It can be understood that the above embodiments are merely exemplary embodiments for explaining the principles of the present disclosure, but the present disclosure is not limited thereto. Those of ordinary skill in the art can make various variations and improvements without departing from the spirit and essence of the present disclosure, and these variations and improvements shall be included into the scope of protection of the present disclosure.

The invention claimed is:

1. A display device, comprising a plurality of display modules, wherein each of the plurality of display modules comprises a display component and a signal processing component; and the plurality of display modules comprise a first display module, the first display module comprising a first display component, a first signal processing component, and a first adjusting circuit; wherein the first display component is connected to the first signal processing component, the first adjusting circuit is electrically connected with a first processor and the first display component, or the first adjusting circuit is disposed in the first processor; the first adjusting circuit is configured to adjust a display parameter of the first display component according to target control information in modulation information; and the first signal processing component comprises a first communication interface, a second communication interface, and a first processor;

wherein the first processor is configured to determine, according to a cascade rule of the plurality of display modules, address information of display modules other than the first display module, and output the address information of other display modules via the second communication interface;

the first processor is further configured to assign, in response to an address assignment instruction received by the first communication interface, address information to the first display module; acquire, in response to the modulation information, target address information in the modulation information; and determine whether the target address information is consistent with current address information of the first display module, if yes, acquire the target control information, and if not, output the modulation information to other display modules via the second communication interface for other display modules to determine whether their address information is consistent with the target address information.

2. The display device according to claim 1, wherein the first processor is further configured to receive the cascade rule of the plurality of display modules via the first communication interface; and the first processor is configured to output, in response to an address assignment instruction received by the first communication interface, the address information of the other display modules via the second communication interface.

3. The display device according to claim 1, wherein the plurality of display modules are connected in a sequential series cascade; a cascade order of the first display module in the plurality of display modules is a first level; and said outputting the address information of the other display modules via the second communication interface comprises:

directly sending an address of a second-level display module to the second-level display module via the second communication interface; and sending address information of a $j^{th}$-level display module to the second-level display module via the second communication interface;

wherein j is a positive integer, $2 \leq j \leq N$, and N is a quantity of the plurality of display modules.

4. The display device according to claim 3, wherein said sending the address information of the $j^{th}$-level display module to the second-level display module via the second communication interface comprises: sending, in response to feedback information of a $(j-1)^{th}$-level display module, the address information of the $j^{th}$-level display module to the second-level display module via the second communication interface.

5. The display device according to claim 1, wherein the plurality of display modules are connected in a sequential series cascade; and the plurality of display modules comprise a second display module, wherein the second display module is the display modules in the plurality of display modules other than the first display module, the second display module comprising a second processor;

wherein the second processor determines, in response to address information of a previous-level display module, whether a current-level display module completes address updating, if yes, forwards received address information to a next-level display module, and if not, performs address updating according to the received address information.

6. The display device according to claim 5, wherein the second processor is further configured to send feedback information to the previous-level display module after performing address updating according to the received address information.

7. The display device according to claim 5, wherein the second processor is further configured to send, in response to feedback information from the next-level display module, the feedback information to the previous-level display module.

8. The display device according to claim 5, wherein the second display module further comprises a third communication interface and a fourth communication interface, wherein a cascade order of the first display module in the plurality of display modules is a first level, and a third communication interface of the second display module at a second level is connected to the second communication interface of the first display module; and for the second display modules of any two adjacent levels, a fourth communication interface of the second display module of a previous level is connected to a third communication interface of the second display module of a next level.

9. The display device according to claim 5, wherein the second display module further comprises a second display component and a second adjusting circuit;

wherein the second processor is further configured to acquire, in response to modulation information, target address information in the modulation information; and determine whether the target address information is consistent with current address information of the second display module, if yes, acquire target control information in the modulation information, and if not, output the modulation information to other display modules for other display modules to determine whether their address information is consistent with the target address information;

the second adjusting circuit is electrically connected with the second processor and the second display component, or the second adjusting circuit is disposed in the second processor; and the second adjusting circuit is configured to adjust a display parameter of the second display component according to the target control information.

10. The display device according to claim 5, wherein series positions of the first display module and at least one second display module are exchangeable; and a function of the first display module is performed in a case that a series position of one of the at least one second display module is exchanged to a series position of the first display module; and a function of the second display module is performed in a case that the series position of the first display module is exchanged to the series position of one of the at least one second display module.

11. The display device according to claim 1, wherein the display device is a spliced display device comprising M display windows, wherein at least some of the M display windows belong to the plurality of display modules, and any one of the plurality of display modules serves as one of the M display windows; and the M display windows are arranged in one row and a plurality of columns, a plurality of rows and one column, or a plurality of rows and a plurality of columns.

12. The display device according to claim 11, wherein the M display windows are arranged in R rows and C columns, R and C being integers greater than 1;

wherein the display device satisfies one of the following:

in any two adjacent rows, a last display window in a previous row is connected to a first display window in a next row, and every two adjacent display windows in a same row are connected;

in any two adjacent columns, a last display window in a previous column is connected to a first display window in a next column, and every two adjacent display windows in a same column are connected;

for any two adjacent display windows in a $u^{th}$ row and a $(u+1)^{th}$ row, in a case that u is an odd number, a last display window in the $u^{th}$ row is connected to a last display window in the $(u+1)^{th}$ row; in a case that u is an even number, a first display window in the $u^{th}$ row is connected to a first display window in the $(u+1)^{th}$ row; and every two adjacent display windows in a same row are connected, wherein u is an integer greater than 0 and less than R; and for any two adjacent display windows in a $v^{th}$ column and a $(v+1)^{th}$ column, in a case that v is an odd number, a last display window in the $v^{th}$ column is connected to a last display window in the $(v+1)^{th}$ column; in a case that v is an even number, a first display window in the $v^{th}$ column is connected to a first display window in the $(v+1)^{th}$ column; and every two adjacent display windows in a same column are connected, wherein v is an integer greater than 0 and less than C.

13. A cascade control method, applied to a display device according to claim 1, wherein the method comprises:

determining, by a first processor of a first display module, address information of display modules other than the first display module according to a cascade rule of a plurality of display modules, and outputting the address information of other display modules via the second communication interface.

14. The method according to claim 13, wherein the first processor receives the cascade rule of the plurality of display modules via the first communication interface; and said outputting the address information of the other display modules via the second communication interface specifically comprises: outputting, by the first processor, address information of the other display modules via the second communication interface in response to an address assignment instruction received by the first communication interface.

15. The method according to claim 13, wherein the plurality of display modules are connected in a sequential series cascade; a cascade order of the first display module in the plurality of display modules is a first level; and said outputting the address information of the other display modules via the second communication interface comprises:

directly sending address information of a second-level display module to the second-level display module via the second communication interface; and sending address information of a $j^{th}$-level display module to the second-level display module via the second communication interface;

wherein j is a positive integer, $2 \leq j \leq N$, and N is a quantity of the plurality of display modules.

16. The method according to claim 13, wherein the first display module further comprises a first adjusting circuit, and the method further comprises:

assigning, by the first processor, in response to an address assignment instruction received by the first communication interface, address information to the first display module; acquiring, in response to modulation information, target address information in the modulation information; and determining whether the target address information is consistent with current address information of the first display module, if yes, acquiring target control information in the modulation information, and if not, outputting the modulation information to other display modules via the second communication interface for other display modules to determine whether their address information is consistent with the target address information; and adjusting, by the first adjusting circuit, a display parameter of the first display component according to the target control information.

17. The method according to claim 13, wherein the plurality of display modules are connected in a sequential series cascade; and the plurality of display modules comprise a second display module, wherein the second display module is a display module in the plurality of display modules other than the first display module, the second display module comprising a second processor; and the method further comprises:

determining, by the second processor, in response to address information of a previous-level display module, whether a current-level display module completes address updating, if yes, forwarding received address information to a next-level display module, and if not, performing address updating according to the received address information.

18. The method according to claim 17, the method further includes:

sending, by the second processor, feedback information to the previous-level display module after performing address updating according to the received address information.

19. The method according to claim 17, the method further includes:

sending, by the second processor, in response to feedback information from the next-level display module, the feedback information to the previous-level display module.

* * * * *